United States Patent
Moon et al.

(10) Patent No.: US 6,678,744 B2
(45) Date of Patent: ***Jan. 13, 2004

(54) APPLICATION WRAPPER METHODS AND SYSTEMS

(75) Inventors: Billy Gayle Moon, Apex, NC (US); Brian Bankler, Cary, NC (US)

(73) Assignee: Ericsson Inc., Research Triangle Park, NC (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 105 days.

(21) Appl. No.: 08/947,986

(22) Filed: Oct. 9, 1997

(65) Prior Publication Data

US 2001/0039598 A1 Nov. 8, 2001

(51) Int. Cl.[7] ................................................ G06F 9/00
(52) U.S. Cl. ...................................... 709/328; 709/315
(58) Field of Search ........................ 395/701; 707/102, 707/103, 101; 345/348, 977, 978; 709/302, 320, 328, 315, 310, 316, 217; 717/120–123, 165, 106–109, 175

(56) References Cited

U.S. PATENT DOCUMENTS

| | | | | |
|---|---|---|---|---|
| 5,361,361 A | * | 11/1994 | Hickman et al. | 395/700 |
| 5,457,798 A | * | 10/1995 | Alfredsson | 709/321 |
| 5,463,770 A | * | 10/1995 | Todd | 707/206 |
| 5,475,845 A | * | 12/1995 | Orton et al. | 709/328 |
| 5,603,025 A | * | 2/1997 | Tabb et al. | 707/2 |
| 5,872,974 A | * | 2/1999 | Mezick | 395/701 |
| 5,983,019 A | * | 11/1999 | Davidson | 395/705 |
| 5,983,234 A | * | 11/1999 | Tietjen et al. | 707/103 |
| 6,003,037 A | * | 12/1999 | Kassabgi et al. | 707/103 |
| 6,336,146 B1 | * | 1/2002 | Burridge et al. | 709/310 |

OTHER PUBLICATIONS

"Microsoft Windows User's Guide," Microsoft Corporation, pp. 79–99, 101–103, 108–113, 118–121, 128–135, 137, and 138, Dec. 1990.*
McCord, "Developing Windows Applications with Borland C + + 3.1, Second Edition," Sams Publishing, pp. 1209–1227, Dec. 1992.*
Nelson et al., "High Performance Dynamic Linking Through Caching, " Sun Microsystems, pp. 1–14.*
Bergamaschi et al., "Object Wrapper: an Object–Oriented Interface for Relational Databases, " IEEE, pp. 41–46, Sep. 1997.*
Taylor et al., "Chiron–1: A Software for User Interface Development, Maintenance, and Run–Time Support, " ACM transactions on Computer–Human Interaction, vol. 2, No. 2 pp 105–144, Jun. 1995.*

(List continued on next page.)

Primary Examiner—Sue Lao
(74) Attorney, Agent, or Firm—Brinks Hofer Gilson & Lione

(57) ABSTRACT

Methods and systems for optimally controlling the operation of object oriented computer software applications use what we call "application wrappers". An application wrapper is a software application that gives programmers the ability to extend their programs' functionality beyond the rigid constraints placed on them by the computer system's operating system. An application wrapper is associated with each software application stored on the computer system and is loaded when the system is powered up. An object oriented display of the application wrapper is generated for the computer user, which can take almost any identifiable form. Application wrappers provide a computer user more rapid modular access to the functional and data files contained within said software applications, saving computer system resources such as RAM and processing time.

10 Claims, 3 Drawing Sheets

OTHER PUBLICATIONS

D. Schmidt, "Wrapper Facade", C++ Report, Feb. 1999, pp. (10).*

E. Gamma, et al, Design Patterns Elements of Reusable Object-oriented Software, Addison-Wesley, 1995, Facade pattern, pp. (8).*

EP 0 780 756 A2, Sun Microsystems Inc., Method and Apparatus for Docking, Launching and Running Applications in a Foreign Environment, Jun. 25, 1997. See p. 1, line 11—p. 2, line 21.

EP 0 394 614 A2, International Business Machines Corporation, Oct. 31, 1990. See p. 4, line 39—p. 5, line 8; p. 5 line 30—p. 6, line 23; and p. 8, line 8—line 47.

Disclosed Anonymously, Customization Techniques for Graphical Interfaces, Jul. 1, 1991. Research Disclosure, no. 327, p. 495 XP000258699.

* cited by examiner

APPLICATION WRAPPER METHODS AND SYSTEMS

BACKGROUND OF THE INVENTION

1. Field of the Invention

The present invention relates to methods and systems for controlling object oriented software applications and, more particularly, to methods and systems for optimally controlling functionality and access to data files contained within object oriented software applications.

2. The Prior Art

Current software standards narrowly define the functions that software may perform before an application is started or launched. All aspects of a program's appearance and behavior within an operating environment are controlled by an operating system. The computer's operating system thus generally constrains the operations of software applications. Features of a software application can only be accessed by starting the entire application, which causes the computer to load a large part of the program, usually in the form of an executable file (".exe") together with several smaller files, into the computer's random access memory ("RAM"). This method of running a software application is time consuming and wastes valuable resources of the computer.

A conventional piece of software that is written to operate under an object oriented operating system, such as Windows® (or Windows 95®, must follow narrow guidelines set forth by the operating system vendor. When a computer user loads the software application into the computer system for the first time, the software application will provide the operating system with enough information to create a static icon and a simple instruction on how to run the program. The icon that is created always remains static and is the only means by which the user can gain access to any of the program's features. The operating system associates the static icon with a command line that will start the software application. When a computer user starts the software application by clicking on or selecting the static icon, the operating system automatically runs the command line that initiates the software application. See FIG. 2.

The command line that the operating system automatically runs when a user activates the static icon will generally start the software application's executable file. In turn, the software application's executable file takes control of the entire software application and loads several files associated with that application's features. Unfortunately, many of these files may be directed to certain features of the software application which the user may not want to use. Consequently, time and processing power may be wasted by loading files which are unnecessary.

As an example, a Windows® software application is written and linked as a program with one or several dynamic link library ("DLL") files. In a software application written for Windows®, large amounts of data must be fully loaded into the operating system and "linked" together. This action requires a lot of RAM, processing power, and time to complete. In addition, software applications written for these operating systems are somewhat cryptic and difficult to install and use. Online help is a frequent solution, but this usually requires the computer user to have already loaded the program into the computer system's main memory and to have started running it before being given access to the help files. If help is offered outside of the application, the computer user must be very knowledgeable about the software application since he or she must know how to locate and pull up various kinds of help files. A few examples of these files are Windows® help files (".HLP"), README.TXT files, and HTML files.

Configuration information for software applications generally does not follow a standard format but is usually very program specific. Usually the configuration information is located within the software application and can only be accessed by starting the entire application. A few software applications will install a second executable file that allows modification of the configuration files without starting the main executable file, but this is the exception and not the norm. In these types of software applications, the two executable files run independently of one another and the user is only allowed access to configuration settings. In order to change a simple configuration setting, for instance, either the entire software application must be running, or a completely separate software application must be started. This can frustrate a computer user and cause a needless overuse of computer system resources. An example would be launching an entire mail system to turn on an auto-reply message or to forward information.

Over the years operating systems have added features that make it appear that the software applications are performing more functions. A typical example of this is animating the mouse pointer while an application is loading. These changes are merely additions to the structure of the program management system found on most operating systems or user interfaces and do not represent any increase in flexibility.

Inflexibility has not previously been considered much of a problem. However, as computers get more powerful and include more memory, users' expectations for computer and software application performance have dramatically increased. Thus, a need exists for improved operating capability and greater flexibility in the use of software applications for object oriented computer systems.

SUMMARY OF THE INVENTION

The present invention provides methods and systems for more optimally controlling object oriented software applications in computer systems and for increasing the flexibility of software applications designed using object oriented programming. In this invention, an "application wrapper" is incorporated into the computer system to permit selective access to specific functions and data of an object oriented software application without starting the entire software application. Where an application wrapper is incorporated into the design of a software application, a programmer has the ability to define the appearance and behavior of the application regardless of the constraints placed on the programmer by the computer's operating system. Thus, the use of an application wrapper avoids the artificial constraints imposed by the operating system, by separating control of the application wrapper from the operating system but at the same time establishing and maintaining a stable interface between the two.

The present invention also provides application wrappers that are capable of communicating with the operating system and can create object oriented displays with graphic capabilities beyond those allowed by the constraints of the operating system. Computer icons can, with the use of an application wrapper of the invention, now be designed to include sound, computer animation, and video clips. Furthermore, the use of an application wrapper gives a programmer the ability to design software applications that run on a modular basis, thereby using less system resources when in operation than the present wholesale program loading.

DETAILED DESCRIPTION OF THE INVENTION

Figure 1:
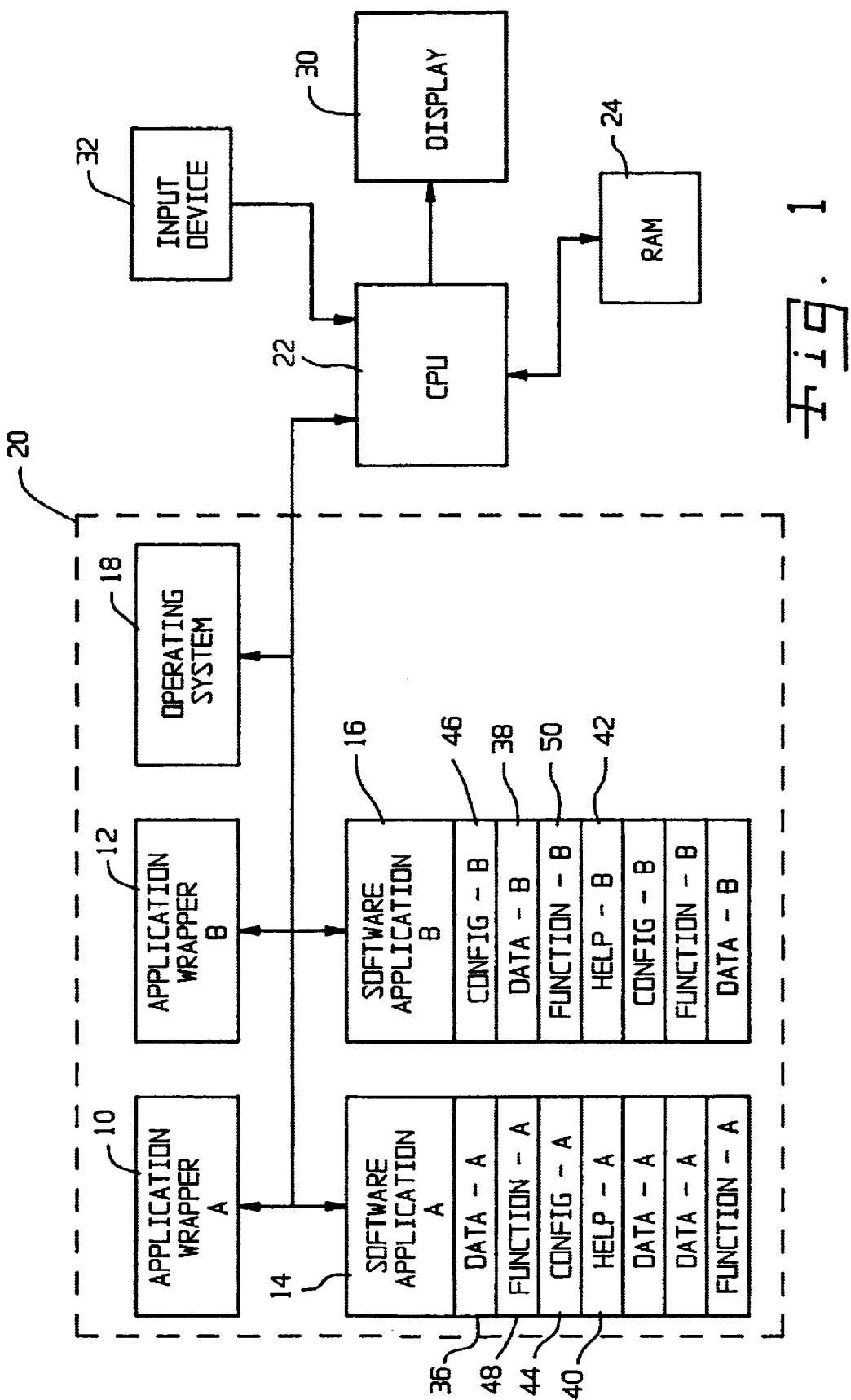
FIG. 1 is a schematic, block diagram showing a simplified model of the manner in which an object oriented software application and application wrapper interact within a computer system according to the present invention.

Referring now to the drawings, like reference numerals designate identical or corresponding elements throughout the several views. FIG. 1 illustrates a preferred embodiment of the invention including two "application wrappers" 10 and 12 for known software applications 14 and 16. An "application wrapper" is a program that runs independently of a computer's operating system 18 and permits a computer user to selectively access individual functions and data of an object oriented software application without starting the entire software application. The incorporation of an application wrapper into an object oriented computer system releases application developers from artificial constraints placed on them by the computer operating system 18. Each of the application wrappers 10 and 12 provides an object oriented method of optimally controlling one of the object oriented software applications 14 and 16 that operate and coexist with the computer's operating system 18.

In FIG. 1, two application wrappers 10 and 12 are illustrated in a main memory 20 within the computer system to demonstrate that one or more application wrappers may be used by a computer system and can also operate at the same time. Application wrapper A10 is associated with a specific software application A14 in the computer system, and application wrapper B12 is associated with a specific software application B16. In a preferred embodiment of the invention each software application installed on the computer system will be assigned an application wrapper. As depicted, both application wrappers 10 and 12 are in communication with the computer's operating system 18 as well as with the central processing unit ("CPU") 22. The operating system 18 views the application wrappers 10 and 12 as independent programs, and all three cooperate in controlling the CPU 22.

The operating system 18 is usually loaded into the computer system and starts running as soon as the computer is powered up and completes its system check. The application wrappers 10 and 12 are loaded as soon as the CPU 22 has completed loading the operating system 18. Therefore, both of the application wrappers 10 and 12 are loaded with the operating system 18 into a random access memory ("RAM") 24 by the CPU 22 upon powering up. See FIG. 3.

Figure 2:
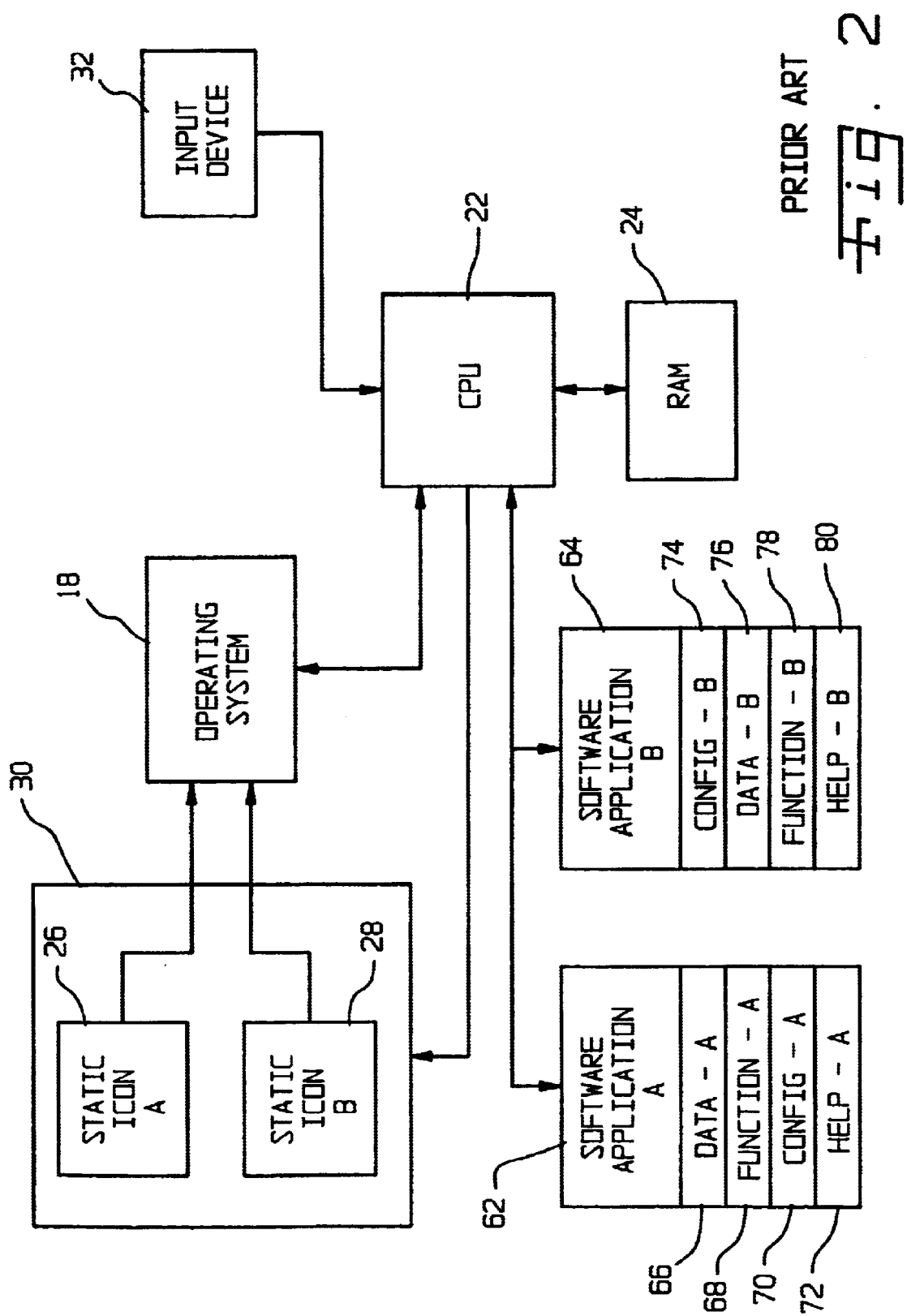
FIG. 2 is a schematic, block diagram of the prior art, showing a simplified model of the manner in which a known object oriented software application interacts within a computer system.

As depicted in the prior art FIG. 2, known software applications 62 and 64 provide enough data to the operating system 18 so that the operating system 18 can create static icons 26 and 28 on a display 30 and a simple instruction that runs software applications 62 and 64. The instruction that causes one of the software applications 62 and 64 to start running on the computer system is activated when one of the static icons 26 or 28 on the display 30 is selected by a computer user through an input device 32, such as a keyboard, touch screen, or mouse. In this type of environment, all aspects of a software application's appearance and behavior are rigidly defined by the features and limitations of the operating system 18.

Referring once again to FIG. 1, in the present invention, once the application wrappers 10 and 12 have been started, object oriented displays of the application wrappers 10 and 12 are generated on the display 30. The application wrappers 10 and 12 can be shown on the display 30 using one of several methods. The preferred method of optimally displaying the application wrappers 10 and 12 is to create small icons within a program manager of the computer system that can be easily seen and accessed. The icons that are used to represent the application wrappers 10 and 12 on the display 30 can change appearance in response to computer user inputs via the input device 32. Unlike the static icons 26 and 28 used in the prior art methods depicted in FIG. 2, the identifying means and icons of an application wrapper 10 and 12 can take the form of anything that a software application's programmer desires to use to attract the attention of the computer user to that particular software application 14 and 16. These identifying means and icons can take the form of sound messages, computer animation, static or video images, or a combination of these. Therefore, software application developers using the application wrappers 10 and 12 as depicted in FIG. 1 are not bound by the constraints of a conventional computer operating system 18.

A further benefit that the application wrappers 10 and 12 can provide to computer programmers is the ability to allow computer users to interface on a modular basis with the application wrappers 10 and 12 and their associated software applications 14 and 16. For example, once software application A14 and all of its dependent parts is loaded into the computer system's main memory 20, application wrapper A10 assigned to software application A14 allows the user to access data files and control the functionality of software application A14. All of the access and control can occur without the actual software application A14 ever being loaded into the computer system's RAM 24. The software application B16 on the computer system would be controlled by its application wrapper B12 in much the same manner. As previously 20 stated, in preferred embodiments of the invention each of the software applications 14 and 16 installed on a computer system is provided with its own respective application wrapper 10 or 12. Thus, by using application wrappers 10 and 12, valuable computer resources, such as processor time and memory, are conserved and made available for other uses.

Once activated by a computer user, each of the application wrappers 10 and 12 can be used separately and selectively in a modular format to access data files 36, 38, help files 40, 42, configuration files 46, 48 and/or other files contained within the associated software application 14 or 16. The application wrappers 10 and 12 can also be used to control the functionality 44, 50 of the software applications 14 and 16 in a modular format. Software applications 14 and 16 generally have online help files 40, 42 associated with the software applications 14 and 16. Application wrapper A10 can, in response to computer user input to the input device 32, provide access to the online help files 40 of software application A14 without ever loading any other piece of the actual software application A14. In addition, application wrapper A10 gives a computer user the ability to access certain functions 48 that software application A14 can perform on a modular basis. Further, application wrapper A10 can be used to provide access to configuration files 44, help files 40, and data files 36 of the software application A14 in a modular format without ever having to load the entire software application A14. Likewise, application wrapper B12 can be used to gain modular access to help files 42, configuration files 46, data files 38, and pieces of functionality 50 of software application B16 without having to load the entire software application.

Prior art methods of controlling software applications, shown in FIG. 2, require software application A62 to be loaded into the computer system's RAM 24 before a computer user can gain access to any data files 66, functionality 68, configuration files 70, or help files 72 of software application A62. In addition, to access any of the data files 76, functionality 78, configuration files 74, and help files 80 of software application B64, that software application B64 would similarly have to be loaded into the computer system's RAM 24. The configuration and help files for these prior art software applications are usually either tightly bound into the software application or comprise an entirely different program. Recently, the help information for some software applications has been separated into different files from the software application in order for the user to be able to view them separately from the software application. However, if the software application does not automatically configure this option when installed, the computer user is required to know the exact location and names of the help files and is also required to invoke a "reader" program that understands the file format.

The ability of methods and systems using application wrappers 10 and 12 to run software applications 14 and 16 on a modular basis conserves computer system resources and gives programmers the ability to include more features in software applications 14 and 16.

Figure 3:
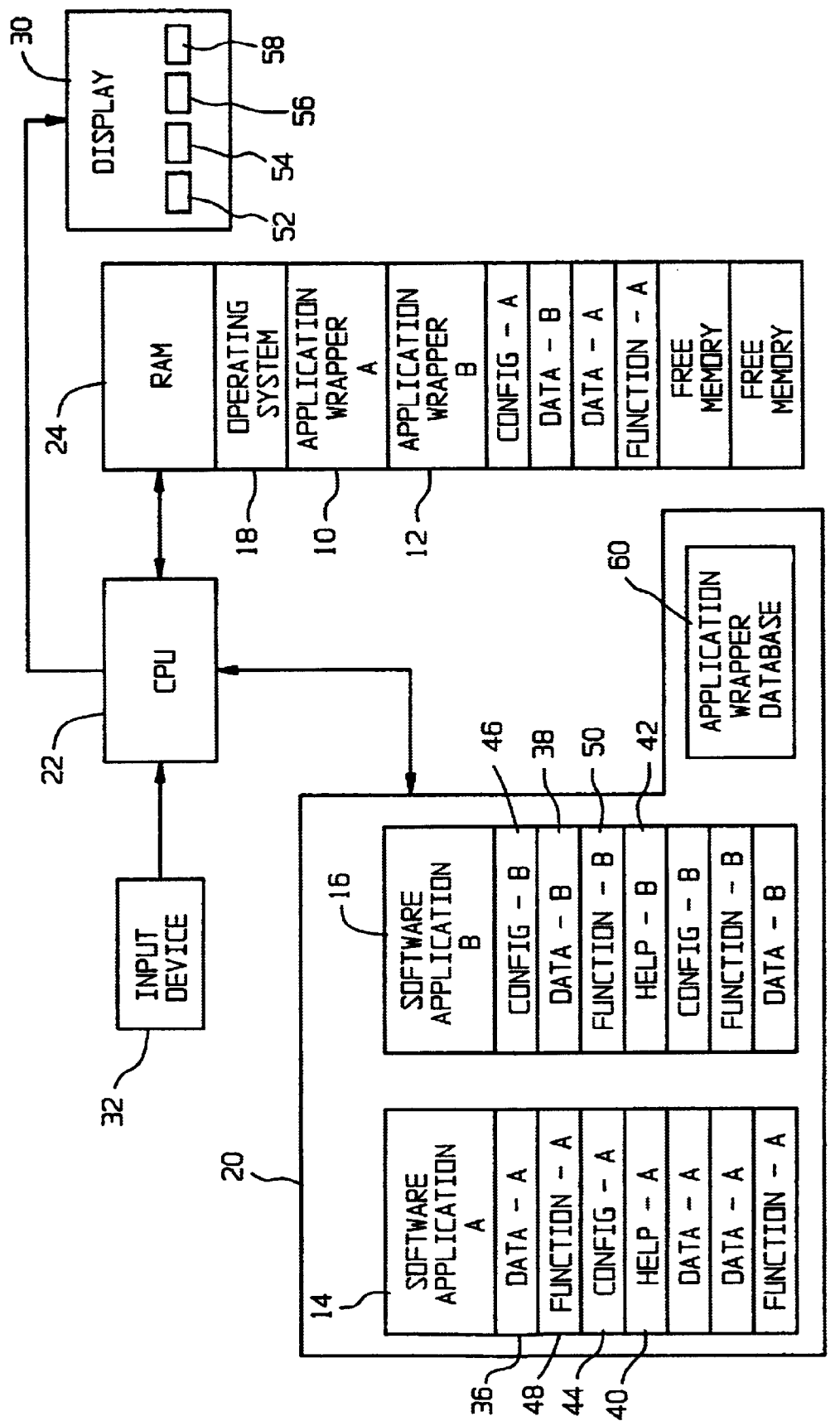
FIG. 3 is a schematic, block diagram illustrating in more detail the manner in which an application wrapper interacts within the computer system according to the present invention.

As shown in FIG. 3, in operation the operating system 18 and application wrappers 10 and 12, are loaded into the computer system's RAM 24. The system generates one or more identifying means or icons 52, 54, 56, 58 that can be used to identify and gain access to any one or more of the files associated with application wrapper A10 and software application A14 and/or application wrapper B12 and software application B16. As indicated above, these identifying means can be static or animated, possibly sequentially, and may have associated sounds. In response to computer user input to the input device 32 selecting one of the application wrapper's icons 52, 54, 56, 58 the CPU 22 loads the selected file or function from the selected software application 14 or 16 into the computer system's RAM 24.

In addition, as shown in FIG. 3, software applications 14 and 16 can comprise several smaller modules or files that reside in main memory 20 until called into operation by computer user input through the input device 32 to the application wrappers 10 and 12 in selecting one or more identifying means 52, 54, 56, 58. Programming with application wrappers 10 and 12 thus allows software applications 14 and 16 to use small modules, thereby reducing the size of files that need to be loaded by the CPU 22. A further benefit of using smaller file sizes to perform different tasks associated with software applications 14 and 16 is realized because less RAM 24 is needed to store and run the software applications 14 and 16.

The invention also provides a stable interface between the application wrappers 10 and 12 and the operating system 18 so that changes may be made to either without affecting the functionality of the other. The application wrappers 10 and 12 are programmed in such a manner as to communicate with the operating system 18 without affecting the manner in which the operating system 18 runs on the computer system. Likewise, each of software applications 14 and 16 can be provided with a link to the operating system 18 which is capable of notifying the software applications 14 and 16 of changes to the operating system 18. For instance, software applications 14 and 16 could be notified of such changes in the operating system 18 as a power up or down of the computer system. Another feature of the present invention is the ability to provide a link between the software applications 14 and 16 and the operating system 18 that ascertains if an object contained in a storage device is one that the software applications 14 and 16 can interpret. This gives the computer user the ability to quickly pull up and view files the software applications 14 and 16 can interpret. Software application A14 and software application B16 are capable of being linked together so that each software application 14 and 16 can call up the functionality of the other to view and manipulate data contained in an object, or the objects can be programmed and stored using a common file format.

Some of the functionality that application wrappers 10 and 12 can control in response to computer user input through the input device 32 are the starting and exiting of the actual software applications 14 and 16. Application wrappers 10 and 12 can be programmed to communicate with other software applications on the computer system regardless of whether the other software applications use application wrappers. In addition, application wrappers 10 and 12 can also be programmed to automatically delete a software application 14 or 16 and all of its dependent objects from the computer system's operating system 18 and main memory 20 in response to computer user inputs to the input device 32.

Each application wrapper 10 and 12 contained on a computer system is associated with a common application wrapper database 60, as shown in FIG. 3. The common application wrapper database 60 may be accessed by the computer user to change configuration settings within each of the application wrappers 10 and 12. The common application wrapper database 60 can also contain information that is common to software applications A14 and B16 in the computer system, and each application wrapper 10 and 12 can share that information. Some of the data and configuration files that may be accessed through the common application wrapper database 60 are the computer user's personal profile, a specific software application's bubble help, settings to control the appearance and behavior of a software application's icon, an option to start any of the software applications 14 and 16 in a secure mode, and limits on the allowable memory usage and priorities of the software applications 14 and 16.

One exemplary embodiment of the invention comprises a communications device or system, such as a cellular telephone. Such a communications device can comprise a small housing carrying a keyboard, an LCD display, a microprocessor, random access memory, more memory, and one or more application wrappers and object oriented software applications for providing one or more user selected functions, such as phone number storage, retrieval and dialing, calculation, global time input, message storage and retrieval, Internet interfacing and the like, and telephone and cellular communication components. Such a device permits a user to carry out a phone call while taking notes, entering information into memory, performing complex calculations, making drawings, and any other application that can be provided by software.

The application wrappers 10 and 12 of the present invention allow a computer user to access and use one or more specific files, such as the help files, of an object oriented software application in the computer system and to enjoy the benefits of a more user-friendly interface with his computer system.

The invention provides computer programmers the ability to create object oriented software applications that are not artificially constrained by the computer's operating system and can be rapidly and easily used. By using an application wrapper as set forth above, the computer programmer can provide optimal control of his software application to a computer user.

The use of application wrappers 10 and 12 is advantageous for any computer system. Preferred embodiments of the present invention can be installed on personal digital assistants to minimize use of computer system resources while obtaining functionality that was not previously possible due to the size constraints and limited storage capacity of smaller hand held computer systems. Application wrappers provide benefits to any computer system due to ease of use and the functionality that can be included in software applications now that were previously barred by constraints of computer operating systems.

While the invention has been described in its currently best known mode and embodiment, other modes and embodiments of the invention will be apparent to those skilled in the art and the invention is limited only by the scope of the claims that follow. For example, while the preferred embodiments illustrate systems incorporating plural application wrappers and software application, methods and systems of the invention can incorporate only a single application wrapper.

What is claimed is:

1. In an improved method of handling the operation of object oriented software applications in a computer system having an operating system, the improvement comprising:

providing a plurality of application wrappers that interface with said operating system, wherein the operating system does not substantially control said plurality of application wrappers, the plurality of application wrappers are not substantially subject to artificial constraints imposed by the operating system, and each of the application wrappers provides an object oriented method of controlling a single object oriented software application;

assigning a single one of a plurality of object oriented software applications to each said application wrapper; and providing modular access to the functional components of each said software application in response to computer user inputs to each said application wrapper without the necessity of starting the entire software application.

2. The improved method of handling the operation of object oriented software applications in a computer system having an operating system of claim 1, wherein at least one application wrapper is loaded upon power up of the computer system.

3. The improved method of handling the operation of object oriented software applications in a computer system having an operating system of claim 1, a further improvement comprising providing modular access to at least one data file of each said software application in response to computer user input to each said application wrapper without the necessity of starting the entire software application.

4. The improved method of handling the operation of object oriented software applications in a computer system having an operating system of claim 1, a further improvement comprising generating an identifying means of each said application wrapper on a display.

5. The improved method of handling the operation of object oriented software applications in a computer system having an operating system of claim 4, wherein said identifying means is generated on a display selected from the group including sound, computer animation, static images and video images.

6. The improved method of handling the operation of object oriented software applications in a computer system having an operating system of claim 4, a further improvement comprising generating a display of each said application wrapper in a response to selection of said identifying means from the computer user.

7. A computer system including controlled object oriented software applications, the system comprising:

a central processing unit;

means for storing and retrieving programs and data connected with said central processing unit;

an operating system stored in said means for storing and retrieving programs and data;

an input device connected with said central processing unit;

a display connected with said central processing unit;

a plurality of object oriented software applications stored in said means for storing and retrieving programs and data; and a plurality of application wrappers that interface with said operating system, wherein the operating system does not substantially control said plurality of application wrappers, the plurality of application wrappers are not substantially subject to artificial constraints imposed by the operating system, and each application wrapper is associated with a single one of said software applications for providing modular access to the functional components of each said software application without starting the entire software application.

8. The computer system including controlled object oriented software applications of claim 7, wherein each said application wrapper provides modular access to at least one data file of each said software application.

9. The computer system including controlled object oriented software applications of claim 7, wherein said computer system is adapted for operating a communications device.

10. The computer system including controlled object oriented software applications of claim 9, wherein said communications device includes a cellular phone.

* * * * *